United States Patent
Shen et al.

(10) Patent No.: US 12,261,780 B2
(45) Date of Patent: Mar. 25, 2025

(54) SYSTEMS AND METHODS FOR AUTOMATICALLY ADJUSTING A TIME-BASED ANTI-REPLAY WINDOW SIZE

(71) Applicant: Cisco Technology, Inc., San Jose, CA (US)

(72) Inventors: Changhong Shen, Shanghai (CN); Chingsung Lin, Fremont, CA (US); Yubei Cao, Cupertino, CA (US); Sandy X. Chang, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 384 days.

(21) Appl. No.: 17/688,994

(22) Filed: Mar. 8, 2022

(65) Prior Publication Data

US 2023/0188469 A1 Jun. 15, 2023

Related U.S. Application Data

(60) Provisional application No. 63/265,226, filed on Dec. 10, 2021.

(51) Int. Cl.
*H04L 47/22* (2022.01)
*H04L 9/40* (2022.01)
*H04L 47/27* (2022.01)
*H04L 47/34* (2022.01)

(52) U.S. Cl.
CPC ............ *H04L 47/225* (2013.01); *H04L 47/27* (2013.01); *H04L 47/34* (2013.01); *H04L 63/0227* (2013.01)

(58) Field of Classification Search
CPC ....... H04L 47/225; H04L 47/27; H04L 47/34; H04L 63/0227; H04L 63/0254; H04L 63/164
See application file for complete search history.

(56) References Cited

U.S. PATENT DOCUMENTS

| | | | |
|---|---|---|---|
| 8,646,090 B1 | 2/2014 | Gadde et al. | |
| 9,246,876 B1* | 1/2016 | Melam | H04L 67/14 |
| 11,212,210 B2* | 12/2021 | Hefel | H04L 45/033 |
| 2012/0036567 A1* | 2/2012 | Senese | H04L 63/061 |
| | | | 726/7 |
| 2012/0042096 A1 | 2/2012 | Wu | |
| 2012/0174216 A1* | 7/2012 | Vukovic | H04L 63/1466 |
| | | | 726/22 |

(Continued)

FOREIGN PATENT DOCUMENTS

CN 104092697 A 10/2014

OTHER PUBLICATIONS

IPsec Data Plane Configuration Guide, Cisco IOS XE Fuji 16.8.x, Americas Headquarters, Copyright 2019, Cisco Systems, Inc.

*Primary Examiner* — Donald L Mills
(74) *Attorney, Agent, or Firm* — Baker Botts L.L.P.

(57) ABSTRACT

In one embodiment, a method includes receiving, by a network node, a packet associated with a session. The method also includes performing, by the network node, a sequence-based anti-replay check and determining, by the network node, that the sequence-based anti-replay check rejected the packet. The method further includes performing, by the network node, a time-based anti-replay check, performing, by the network node, a selective anti-replay check, and determining, by the network node, whether to dynamically adjust a time-based anti-replay window size.

20 Claims, 3 Drawing Sheets

(56) References Cited

U.S. PATENT DOCUMENTS

2014/0281530 A1\* 9/2014 Song ................... H04L 63/123
                                                     713/168
2019/0238585 A1\* 8/2019 Millman ............ H04L 63/1416
2021/0006545 A1   1/2021 Kariyanahalli et al.
2021/0406410 A1\* 12/2021 Mondello ............... G06F 21/64

\* cited by examiner

SYSTEMS AND METHODS FOR AUTOMATICALLY ADJUSTING A TIME-BASED ANTI-REPLAY WINDOW SIZE

CROSS-REFERENCE TO RELATED APPLICATIONS

This application claims benefit of U.S. Provisional Patent Application No. 63/265,226 filed Dec. 10, 2021 by Changhong Shen et al. and entitled "AUTOMATED ADJUSTMENT OF EXTENDED ANTI-REPLAY TIME WINDOW SIZE BASED ON SECURITY ATTACK RISK," which is incorporated herein by reference as if reproduced in its entirety.

TECHNICAL FIELD

The present disclosure relates generally to communication networks, and more specifically to systems and methods for automatically adjusting a time-based anti-replay window size.

BACKGROUND

In a software-defined wide area network (SD-WAN), Internet Protocol Security (IPSec) Security Associations (SA) may be established for multiple virtual private networks (VPNs). When a Quality of Service (QoS) policy is applied per VPN, packets are prioritized based on their forwarding class and associated interface queue, and the bandwidth available for the VPN to which the packets belong. As a result, during congestion, the IPSec encapsulated packets may be forwarded out of sequence and dropped by the receiving device.

DESCRIPTION OF EXAMPLE EMBODIMENTS

Overview

Figure 1:
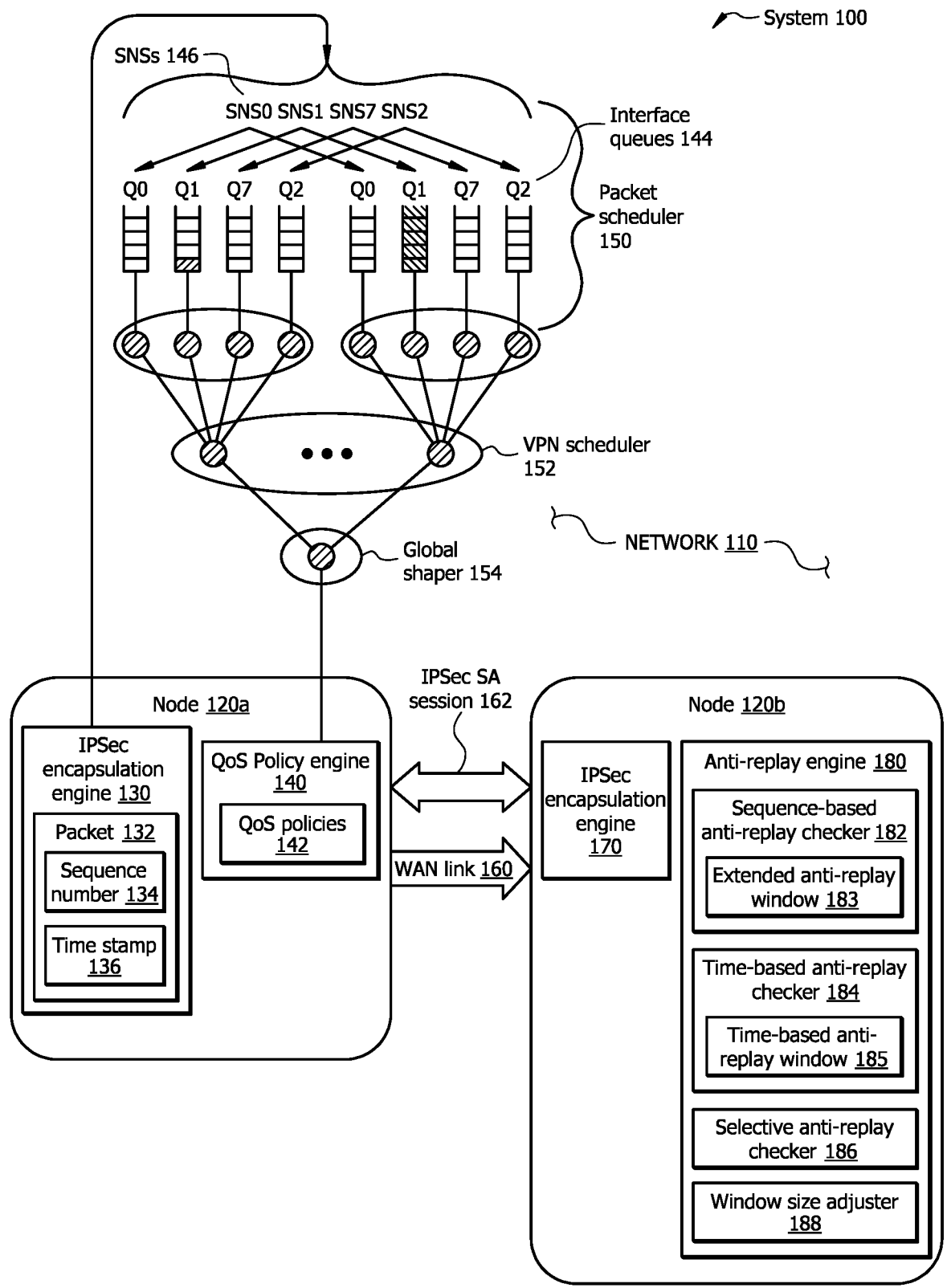
FIG. 1 illustrates an example system for automatically adjusting a time-based anti-replay window size.

According to an embodiment, a network node includes one or more processors and one or more computer-readable non-transitory storage media coupled to the one or more processors and including instructions that, when executed by the one or more processors, cause the network node to perform operations. The operations include receiving a packet associated with a session. The operations also include performing a sequence-based anti-replay check and determining that the sequence-based anti-replay check rejected the packet. The operations further include performing a time-based anti-replay check, performing a selective anti-replay check, and determining whether to dynamically adjust a time-based anti-replay window size. In some embodiments, the network node is an SD-WAN edge router. In certain embodiments, the session is an IPSec SA session.

In certain embodiments, the operations include determining that the packet was rejected by the time-based anti-replay check, determining that the packet was accepted by the selective anti-replay check, rejecting the packet, and/or increasing the time-based anti-replay window size. In some embodiments, the operations include determining that the packet was rejected by the selective anti-replay check, rejecting the packet, and/or decreasing the time-based anti-replay window size.

In certain embodiments, performing the sequence-based anti-replay check includes determining a sequence number associated with the packet, rejecting the packet in the event the sequence number is less than a lowest sequence number in an anti-replay window, and/or accepting the packet in the event the sequence number is greater than the lowest sequence number in the anti-replay window. In some embodiments, performing the time-based anti-replay check includes determining whether a time tick delay associated with the session is within a time-based anti-replay window.

In certain embodiments, performing the selective anti-replay check includes determining whether a quantity of duplicate packets received outside of an anti-replay window and within a predetermined amount of time exceeds a predetermined threshold.

According to another embodiment, a method includes receiving, by a network node, a packet associated with a session. The method also includes performing, by the network node, a sequence-based anti-replay check and determining, by the network node, that the sequence-based anti-replay check rejected the packet. The method further includes performing, by the network node, a time-based anti-replay check, performing, by the network node, a selective anti-replay check, and determining, by the network node, whether to dynamically adjust a time-based anti-replay window size.

According to yet another embodiment, one or more computer-readable non-transitory storage media embody instructions that, when executed by a processor, cause the processor to perform operations. The operations include receiving a packet associated with a session. The operations also include performing a sequence-based anti-replay check and determining that the sequence-based anti-replay check rejected the packet. The operations further include performing a time-based anti-replay check, performing a selective anti-replay check, and determining whether to dynamically adjust a time-based anti-replay window size.

Technical advantages of certain embodiments of this disclosure may include one or more of the following. Certain embodiments described herein automatically adjust the size of a time-based anti-replay window based on a time tick variation across packets received within a valid time window range, which addresses the challenges of varied delay that may be introduced based on the QoS profile such as packet size and/or queue-limits (which may introduce a longer delay). Certain embodiments of this disclosure include an anti-replay engine that detects packet duplication in regular and/or extended mode. Certain embodiments may adaptively adjust the tolerance time window based on a customer's network situation (e.g., based on the measured jitter/latency). This automated adjustment of the size of time-based anti-replay window may increase simplicity and usability for per-VPN/per-tenant QoS deployment for varied use cases and customer deployments while mitigating the system from security attack risk by packet duplication.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for automatically adjusting a time-based anti-replay window size.

QoS out-of-order delay of packets may vary based on different tenant edge QoS policy profiles such as bandwidth, queue-limits, and/or traffic profile during a congestion state. One size of a time-based anti-replay window may not accommodate the requirements for IPSec sessions connected with different nodes. In certain embodiments, rather than using a configured fixed size for the time-based anti-replay window, the IPSec data-plane automatically learns and adjusts the size of the time-based anti-replay window based on data associated with time stamps within packets when drops are reported for each independent IPSec SA session. This learning process for the maximum packet delay may be introduced after per-VPN QoS policies are applied.

FIG. 1 illustrates an example system 100 for automatically adjusting a time-based anti-replay window size. System 100 or portions thereof may be associated with an entity, which may include any entity, such as a business, company, or enterprise, that uses anti-replay. In certain embodiments, the entity may be a service provider that provides anti-replay services. The components of system 100 may include any suitable combination of hardware, firmware, and software. For example, the components of system 100 may use one or more elements of the computer system of FIG. 3.

In the illustrated embodiment of FIG. 1, system 100 includes a network 110, nodes 120 (e.g., node 120a and node 120b), an IPSec encapsulation engine 130, a packet 132, a sequence number 134, a time stamp 136, a QoS policy engine 140, QoS policies 142, interface queues 144, sequence name spaces (SNSs) 146, a packet scheduler 150, a VPN scheduler 152, a global shaper 154, a WAN link 160, an IPSec SA session 162, an IPSec decapsulation engine 170, an anti-replay engine 180, a sequence-based anti-replay checker 182, an extended anti-replay window 183, a time-based anti-replay checker 184, a time-based anti-replay window 185, a selective anti-replay checker 186, and an anti-replay window size adjustor 188.

Network 110 of system 100 is any type of network that facilitates communication between components of system 100. Network 110 may connect one or more components of system 100. One or more portions of network 110 may include an ad-hoc network, the Internet, an intranet, an extranet, a VPN, an Ethernet VPN (EVPN), a local area network (LA)N, a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN.

Network 110 may include one or more nodes 120 (e.g., node 120a and node 120b). Nodes 120 are connection points within network 110 that receive, create, store and/or send data along a path. Nodes 120 may include one or more redistribution points that recognize, process, and forward data to other nodes 120 of network 110. Nodes 120 may include virtual and/or physical nodes 120. Nodes 120 may include one or more virtual machines, hardware devices, bare metal servers, and the like. As another example, nodes 120 may include data communications equipment such as computers, routers, servers, printers, workstations, switches, bridges, modems, hubs, and the like. In certain embodiments, nodes 120 are edge routers (e.g., WAN edge routers or SD-WAN edge routers). In some embodiments, nodes 120 use static and/or dynamic routing to send data to and/or receive data to other nodes 120 of system 100. Node 120a of system 100 includes IPSec encapsulation engine 130, packet 132, and QoS policy engine 140. Node 120b of system 100 includes IPSec decapsulation engine 170 and anti-replay engine 180.

IPSec encapsulation engine 130 of system 100 uses IPSec to encapsulate packet 132. Packet 132 of system 100 is a formatted unit of data carried by network 110. In certain embodiments, packet 132 incudes control information and user data (e.g., a payload). In some embodiments, control information provides data for delivering the payload. For example, the control information may include a source network address, a destination network address, an error detection code, a security parameter (e.g., a security parameter index (SPI)), sequencing information (e.g., sequence number 134), integrity check information (e.g., an integrity check value (ICV), and the like. In certain embodiments, the control information is in the header and/or trailer of packet 132. The control information of packet 132 may be used to uniquely identify dropped packets 132.

In certain embodiments, IPSec encapsulation engine 130 adds security services to the IP layer in a way that is compatible with IPv4 and IPv6 standards. IPsec encapsulation engine 130 may encrypt the header of packets 132 and/or the payload of packets 132. In some embodiments, IPsec encapsulation engine 130 implements Encapsulating Security Payload (ESP). The ESP may include six parts. The first part is a Security Parameter Index (SPI), which is an arbitrary 32-bit number that tells the device receiving packet 132 what group of security protocols the sender is using for communication. The second part is sequence number 134, which is a counter that is incremented by 1 each time a packet is sent to the same address and uses the same SPI. Sequence numbers 134 are used to identify packets 132. Sequence numbers 135 may indicate how many packets 132 have been sent with the same group of parameters. In certain embodiments, sequence numbers 134 protect against replay attacks. A replay attack is a form of network attack in which a valid data transmission is maliciously or fraudulently repeated or delayed. For example, a replay attack may involve an attacker who copies packet 132 and sends packet 132 out of sequence to confuse communicating devices.

In certain embodiments, the first and second parts of the ESP are not encrypted (but may be authenticated). The remaining four parts of the ESP may be encrypted during transmission across network 110. The third part of the ESP is the payload data, which is the actual data that is carried by packet 132. The fourth part of the ESP is the padding, which may range from 0 to 255 bytes of data and may allow certain types of encryption algorithms to require the data to be a multiple of a certain number of bytes. The fifth part of the ESP is the pad length field, which specifies how much of the payload is padding rather than data. The sixth part of the ESP is the next header field, which identifies the type of data carried and the protocol.

In certain embodiments, IPSec encapsulation engine 130 adds an ESP authentication field to packet 132. The ESP authentication field includes an ICV, which functions as a digital signature that is computed over the remaining part of the ESP. The ESP authentication field may vary in length depending on the authentication algorithm used. Authentication is calculated on the ESP packet once encryption is complete. In certain embodiments, the ICV supports symmetric type authentication. For example, node 120a (the sending device) may encrypt a hash of the data payload and attach the data payload as the authentication field. In some embodiments, node 120b (the receiving device) confirms that nothing has been tampered with and that the payload was received from the correct source device.

An SA is a one-way relationship between node 120a (the sender) and node 120b (the receiver) that affords security services to the traffic carried on it. The SA groups together all the elements needed for node 120a and node 120b to communicate securely. An SA may be uniquely identified by three parameters: the SPI, the IP destination address, and a security protocol identifier. An SA may be defined by one or more of the following parameters: a sequence number counter (a 32-bit value used to generate the sequence number field in Authentication Header (AH) or ESP headers); a sequence counter overflow (a flag indicating whether overflow of the sequence number counter should generate an auditable event and prevent further transmission of packets on the particular SA); and an anti-replay window (used to determine whether an inbound AH or ESP packet is a replay by defining a sliding window within which sequence number 134 must fall).

QoS policy engine 140 of system 100 applies QoS policies 142 to packet 132. QoS policy engine 140 may apply one or more QoS policies 142 to achieve a specific QoS for each VPN or each group of VPNs. One or more QoS policies 142 may create forwarding classes and associate the forwarding classes with specific interface queues 144 (e.g., queue 0 to queue 7). In certain embodiments, packets 132 from each of eight interface queues 144 are encapsulated using a different sequence number space (SNS) 146 (e.g., SNS 0, SNS 1, SNS 7, and SNS 2). SNSs 146 align with the egress queuing scheme so that all packets 132 in a given interface queue 144 receive sequence number 134 from the same SNS 146. This eliminates the possibility of egress QoS causing reordering of packets 132 since packets 132 in the same SNS 146 go through the same queue 144. In certain embodiments, to differentiate traffic from different applications, traffic from each application or application group is assigned to a specific forwarding class.

In certain embodiments, one or more QoS policies 142 may define a VPN list consisting of a VPN or two or more VPNs that must be treated alike. In certain embodiments, one or more QoS policies 142 may use QoS maps to define parameters such as bandwidth and buffer percentage, and/or the scheduling and packet-drop schemes for each interface queue 144. In certain embodiments, one or more QoS policies 142 may use VPN QoS maps to associate QoS maps with VPN lists and define the minimum and maximum bandwidth that must be used by traffic belonging to the VPNs in a particular VPN list.

In some embodiments, a three-level hierarchical QoS model is applied to packets 132 using one or more QoS policies 142. The hierarchical QoS model may include a packet scheduler 150, a VPN scheduler 152, and a global shaper 154. Packet scheduler 150 schedules packets 132 based on forwarding classes and bandwidth distribution among interface queues 144. VPN scheduler 152 schedules packets 132 and distributes bandwidth among VPNs or VPN groups. Global shaper 154 shapes the WAN interface bandwidth.

When QoS policies 142 are applied to packets 132, node 120a may prioritize packets 132 based on their forwarding class, associated interface queue 144, and/or bandwidth available for the VPN to which packets 132 belong. As a result, during a congestion, IPSec encapsulated packets 132 may be forwarded out of sequence and may be dropped by node 120b (the receiving node). To avoid valid out-of-sequence packets 132 from being dropped, an extended anti-replay window may be configured on one or more nodes 120. In the illustrated embodiment of FIG. 1, anti-replay is enabled on node 120a and node 120b to prevent and/or reduce replay attacks. IPSec provides anti-replay protection against an attacker who duplicates encrypted packets 132 by assigning a monotonically increasing sequence number 134 to each encrypted packet 132. In the illustrated embodiment of FIG. 1, node 120a assigns sequence numbers 134 to packets 132.

WAN link 160 of system 100 is a transport that communicates traffic between nodes 120 (e.g., node 120a and node 120b). In certain embodiments, node 120a (e.g., an SD-WAN edge router) of system 100 receives traffic from a branch network and routes the traffic to a remote branch through node 120b (e.g., an SD-WAN edge router) via WAN link 160. WAN link 160 from the WAN interface of node 120a has limited bandwidth. To achieve a desired QoS for traffic belonging to different applications, system 100 may control how this limited bandwidth is used. When the traffic from the branch network belongs to different VPNs, the bandwidth that can be used by traffic belonging to different VPNs may be restricted. In certain embodiments, the traffic belonging to each VPN may be categorized into various priority classes through one or more QoS policies 142.

IPSec SA session 162 of system 100 is a communication session between node 120a and node 120b. In certain embodiments, node 120a and node 120b set up SAs that include policy parameters to be used during IPSec session 162. The SAs may be unidirectional for IPSec so that node 120a will offer node 120b a policy. If node 120b accepts this policy, node 120b will send that policy back to node 120a. This establishes two one-way SAs between node 120a and node 120b. Two-way communication includes two SAs (one for each direction). In the illustrated embodiment of FIG. 1, one or more IPSec SA sessions 162 are established between node 120a and node 120b.

Node 120b of system 100 includes IPSec decapsulation engine 170 and anti-replay engine 180. IPSec decapsulation engine 170 uses information from packets 132 provided by IPSec encapsulation engine 130 to decrypt the data in packets 132. Anti-replay engine 180 provides anti-replay protection against potential attackers. In certain embodiments, anti-replay engine 180 determines whether to accept and/or reject packets 132 in response to an analysis performed by sequence-based anti-replay checker 182, time-based anti-replay checker 184, and/or selective anti-replay checker 186. In the illustrated embodiment of FIG. 1, anti-replay engine 180 includes sequence-based anti-replay checker 182, time-based anti-replay checker 184, selective anti-replay checker 186, and window size adjuster 188.

Sequence-based anti-replay checker 182 of anti-replay engine 180 performs sequence-based anti-replay checks on packets 132 by analyzing sequence numbers 134 associated with packets 132. In certain embodiments, sequence-based anti-replay checker 182 only accepts packets 132 received out of order for a limited size of extended anti-replay window 183. If sequence number 134 of packet 132 falls within extended anti-replay window 183 and packet 132 was not previously received, sequence-based anti-replay checker

182 marks packet 132 as accepted. If sequence number 134 of packet 132 falls within extended anti-replay window 183 and was previously received, packet 132 is marked as dropped, and the replay counter is incremented. If sequence number 134 is greater than the highest sequence number in extended anti-replay window 183, sequence-based anti-replay checker 182 marks packet 132 as accepted. If packet 132 passes integrity checks and is valid, extended anti-replay window 183 is moved to the right. If sequence number 134 is less than the lowest sequence extended anti-replay window 183, sequence-based anti-replay checker 182 marks packet 132 as dropped, and the replay counter is incremented.

Time-based anti-replay checker 184 of anti-replay engine 180 performs time-based anti-replay checks by analyzing time stamps 136 associated with packets 132. In certain embodiments, time-based anti-replay checker 184 checks time stamp 136 associated with incoming packet 132. Time stamp 136 of packet 132 includes the pseudotime value at which node 120a created packet 132. In certain embodiments, time-based anti-replay checker 184 compares the pseudotime value of node 120a with its own pseudotime value to determine whether packet 132 is a replayed packet. Time-based anti-replay checker 184 may use time-based anti-replay window 185 to mark packets 132 that include a time-stamp value within time-based anti-replay window 185 as accepted. For example, if time stamp 136 is within time-based anti-replay window 185 and/or exceeds the highest time stamp in time-based anti-replay window 185, time-based anti-replay checker 184 may accept packet 132. In certain embodiments, time-based anti-replay checker 184 may determine to drop packet 132 if time stamp 136 is lower than the lowest time stamp in time-based anti-replay window 185. For example, if packet 132 arrived too late, time-based anti-replay checker 184 may mark packet 132 as dropped.

Time-based anti-replay checker 184 may be exposed to packet duplication attack. In certain embodiments, time-based anti-replay window 185 is automatically adjusted based on extended anti-replay delay variation time and/or anti-replay attack risk (e.g., packet duplication) for a specific IPSec SA session 162, which may avoid unexpected packet drops due to a fixed extended anti-replay window size. For example, if sequence number 134 of packet 132 is lower than the lowest sequence number in extended anti-replay window 183, node 120b examines time stamp 136 associated with packet 132. If time stamp 136 is within time-based anti-replay window 185 or exceeds the highest time stamp in time-based anti-replay window 185, packet 132 is accepted. If time stamp 136 is lower than the lowest time stamp in time-based anti-replay window 185, packet 132 is dropped.

Selective anti-replay checker 186 of anti-replay engine 180 performs selective anti-replay checks by analyzing a range of samples of out-of-window packets 132 for duplicate packets 132 within a predetermined time period. In certain embodiments, selective anti-replay checker 186 may determine to reject packet 132 if the number of duplicate packets 132 received by node 120b within the last predetermined time period (e.g., 50 milliseconds) exceeds a predetermined threshold.

Window size adjustor 188 of system 100 automatically adjusts the size of extended anti-replay window 183 and/or time-based anti-replay window 185 in response to one or more determinations from sequence-based anti-replay checker 182, time-based anti-replay checker 184, and/or selective anti-replay checker 186. In certain embodiments, if time-based anti-replay checker 184 determines that the time tick delay between packets 132 is constantly greater than a default size (e.g., 256 milliseconds) of time-based anti-replay window 185 for a predetermined time duration (e.g., 5 minutes) without packet anti-replay failure detected for regular and/or extended anti-replay check, window size adjustor 188 may learn the maximum time delay of packets 132 and automatically adjust the size of time-based anti-replay window 185. For example, window size adjustor 188 may automatically increase the size of time-based anti-replay window 185 to a maximum size (e.g., 384 milliseconds) in predetermined increments (e.g., 16 milliseconds).

In some embodiments, if a packet duplication failure is detected by sequence-based anti-replay checker 182 for exceeding a predetermined threshold, window size adjustor 188 automatically decreases the current size of time-based anti-replay window 185. For example, window size adjustor 188 may automatically decrease the size of time-based anti-replay window 185 to a minimum size (e.g., 256 milliseconds) in predetermined increments (e.g., 16 milliseconds). In certain embodiments, window size adjustor 188 automatically decreases the size of time-based anti-replay window 185 to a predetermined fraction of its current size (e.g., two-thirds of 384 milliseconds, or 256 milliseconds). This automated adjustment of the size of time-based anti-replay window 185 may increase simplicity and usability for per-VPN/per-tenant QoS deployment for varied use cases and customer deployments while mitigating system 100 from security attack risk by packet duplication.

In certain embodiments, window size adjustor 188 automatically adjusts the size of extended anti-replay window 183 and/or time-based anti-replay window 185 for each IPSec SA session 162. For example, if packet duplication is detected by sequence-based anti-replay checker 182 during a particular IPSec SA session 162, window size adjustor 188 may automatically decrease the size of time-based anti-replay window 185. As another example, if selective anti-replay checker 186 determines that packet 132 is out-of-sequence of extended anti-replay window 183 but within the size of extended anti-replay window 183, window size adjustor 188 may automatically decrease the size of time-based anti-replay window 185. Automatically decreasing the size of time-based anti-replay window 185 may minimize the risk and/or prevent security attacks from external networks.

In operation, node 120b of system 100 receives packet 132 from node 120a via WAN link 160 during IPSec SA session 162. Sequence-based anti-replay checker 182 of node 120b performs a sequence-based anti-replay check to determine whether sequence number 134 of packet 132 is within a limited range of extended anti-replay window 183 and/or whether sequence number 134 of packet 132 is a duplicate sequence. If sequence-based anti-replay checker 182 of node 120b determines that sequence-based anti-replay check accepted packet 132, anti-replay engine 180 accepts packet 132

If sequence-based anti-replay checker 182 of node 120b determines that sequence-based anti-replay check rejected packet 132 in response to sequence number 134 of packet 132 being the same as another sequence number 134 received by node 120b during IPSec session 162, anti-replay engine 180 rejects packet 132 due to duplicate sequence and window size adjustor 188 decreases time-based anti-replay window 185. If node 120b determines that sequence-based anti-replay checker 182 rejected packet 132 in response to sequence number 134 of packet 132 being outside of extended anti-replay window 183, node 120b performs a time-based anti-replay check and a selective anti-replay check. Time-based anti-replay checker 184 of node 120*b* performs a time-based anti-replay check to determine whether the time tick is within time-based anti-replay window 185. Selective anti-replay checker 186 of node 120*b* performs a selective anti-replay check to determine whether a range of samples of out-of-window packets 132 received within a predetermined time period include duplicate packets 132.

If node 120*b* determines that packet 132 received from node 120*a* was accepted by both time-based anti-replay checker 184 and selective anti-replay checker 186, anti-replay engine 180 of node 120*b* accepts packet 132. If node 120*b* determines that packet 132 received from node 120*a* was rejected by time-based anti-replay checker 184 and accepted by selective anti-replay checker 186, anti-replay engine 180 of node 120*b* rejects packet 132, and window size adjustor 188 increases time-based anti-replay window 185. If node 120*b* determines that packet 132 received from node 120*a* was rejected by selective anti-replay checker 186, anti-replay engine 180 of node 120*b* rejects packet 132 received from node 120*a*, and window size adjustor 188 decreases time-based anti-replay window 185. As such, system 100 automatically adjusts the size of time-based anti-replay window 185, which may reduce security attacks from external networks.

Although FIG. 1 illustrates a particular number of networks 110, nodes 120 (e.g., node 120*a* and node 120*b*), IPSec encapsulation engines 130, packets 132, sequence numbers 134, a time stamps 136, QoS policy engines 140, QoS policies 142, interface queues 144, SNSs 146, packet schedulers 150, VPN schedulers 152, global shapers 154, WAN links 160, IPSec SA sessions 162, IPSec decapsulation engines 170, anti-replay engines 180, sequence-based anti-replay checkers 182, extended anti-replay windows 183, time-based anti-replay checkers 184, time-based anti-replay windows 185, selective anti-replay checkers 186, and anti-replay window size adjustors 188, this disclosure contemplates any suitable number of networks 110, nodes 120 (e.g., node 120*a* and node 120*b*), IPSec encapsulation engines 130, packets 132, sequence numbers 134, a time stamps 136, QoS policy engines 140, QoS policies 142, interface queues 144, SNSs 146, packet schedulers 150, VPN schedulers 152, global shapers 154, WAN links 160, IPSec SA sessions 162, IPSec decapsulation engines 170, anti-replay engines 180, sequence-based anti-replay checkers 182, extended anti-replay windows 183, time-based anti-replay checkers 184, time-based anti-replay windows 185, selective anti-replay checkers 186, and anti-replay window size adjustors 188. For example, system 100 may include more than two nodes 120.

Although FIG. 1 illustrates a particular arrangement of network 110, nodes 120 (e.g., node 120*a* and node 120*b*), IPSec encapsulation engine 130, packet 132, sequence number 134, time stamp 136, QoS policy engine 140, QoS policies 142, interface queues 144, SNSs 146, packet scheduler 150, VPN scheduler 152, global shaper 154, WAN link 160, IPSec SA session 162, IPSec decapsulation engine 170, anti-replay engine 180, sequence-based anti-replay checker 182, extended anti-replay window 183, time-based anti-replay checker 184, time-based anti-replay window 185, selective anti-replay checker 186, and anti-replay window size adjustor 188, this disclosure contemplates any suitable arrangement of network 110, nodes 120 (e.g., node 120*a* and node 120*b*), IPSec encapsulation engine 130, packet 132, sequence number 134, time stamp 136, QoS policy engine 140, QoS policies 142, interface queues 144, SNSs 146, packet scheduler 150, VPN scheduler 152, global shaper 154, WAN link 160, IPSec SA session 162, IPSec decapsulation engine 170, anti-replay engine 180, sequence-based anti-replay checker 182, extended anti-replay window 183, time-based anti-replay checker 184, time-based anti-replay window 185, selective anti-replay checker 186, and anti-replay window size adjustor 188. Furthermore, although FIG. 1 describes and illustrates particular components, devices, or systems carrying out particular actions, this disclosure contemplates any suitable combination of any suitable components, devices, or systems carrying out any suitable actions.

Figure 2:
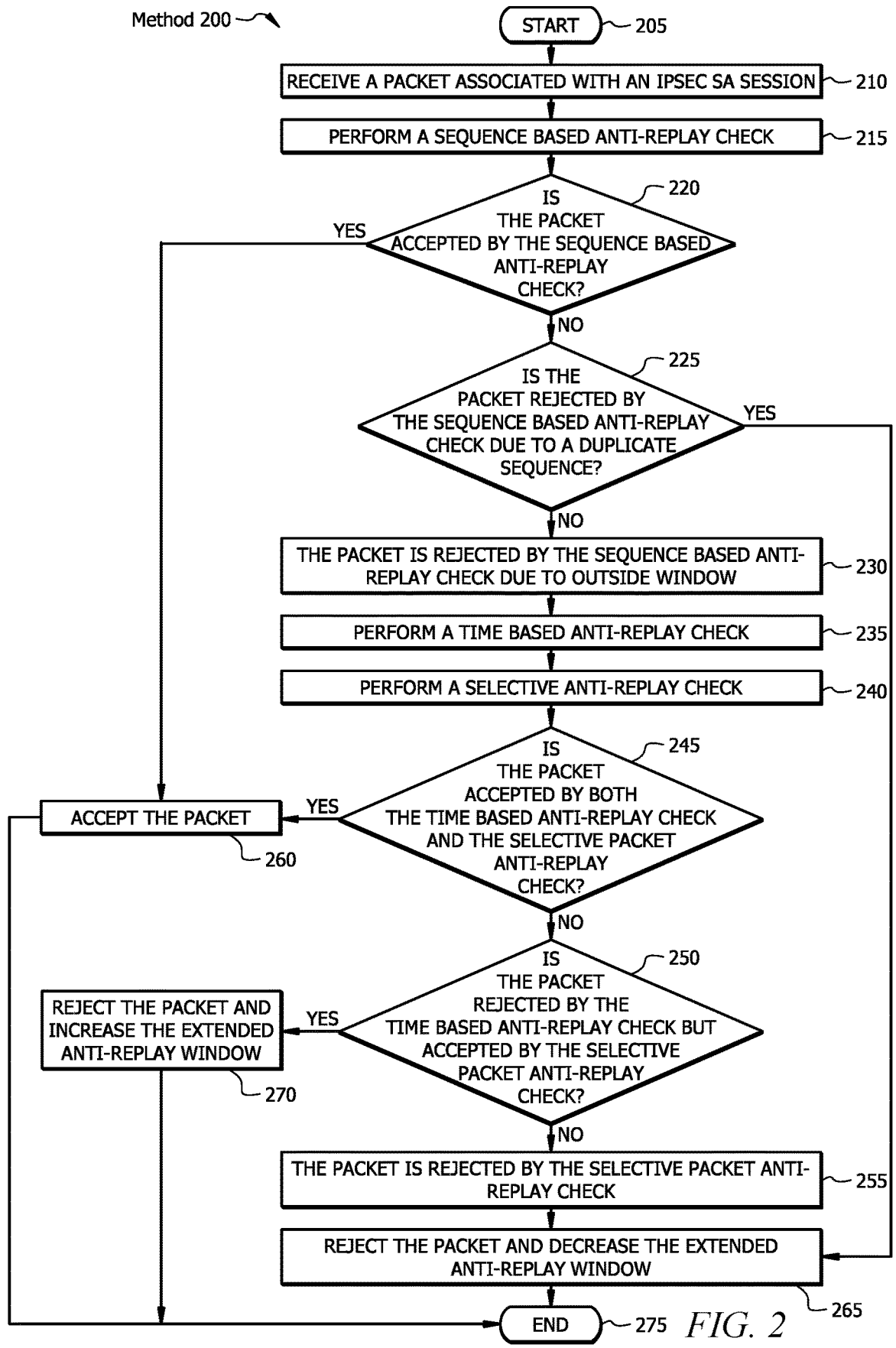
FIG. 2 illustrates an example method for automatically adjusting a time-based anti-replay window size.

FIG. 2 illustrates an example method 200 for automatically adjusting an extended anti-replay time window size. Method 200 of FIG. 2 may be used by system 100 of FIG. 1. Method 200 starts at step 205. At step 210 of method 200, a network node receives a packet associated with a session. For example, referring to FIG. 1, node 120*b* may receive packet 132 from node 120*a*. Packet 132 may be associated with an IPSec SA session (e.g., IPSec session 162 of FIG. 1). Method 200 then moves from step 210 to step 215, where the network node performs a sequence-based anti-replay check on the packet. For example, referring to FIG. 1, sequence-based anti-replay checker 182 of node 120*b* may perform a sequence-based anti-replay check to determine whether sequence number 134 of packet 132 is within a limited range of extended anti-replay window 183 and/or whether sequence number 134 of packet 132 is a duplicate sequence. Method 200 then moves from step 215 to step 220.

At step 220 of method 200, the node determines whether the packet is rejected by the sequence-based anti-replay check due to a duplicate sequence. For example, referring to FIG. 1, sequence-based anti-replay checker 182 of node 120*b* may determine that sequence-based anti-replay check rejected packet 132 in response to sequence number 134 of packet 132 being the same as another sequence number received by node 120*b* during IPSec session 162. If the network node determines that the packet was rejected by the sequence-based anti-replay check due to a duplicate sequence, method 200 advances from step 220 to step 265, where the network node rejects the packet and decreases the time-based anti-replay window. For example, referring to FIG. 1, anti-replay engine 180 of node 120*b* may reject packet 132 in response to determining that sequence-based anti-replay checker 182 rejected packet 132, and window size adjustor 188 of node 120*b* may decrease time-based anti-replay window 185. Method 200 moves from step 265 to step 275, where method 200 ends. If, at step 220, the network node determines that the packet was not rejected by the sequence-based anti-replay check due to a duplicate sequence, method 200 moves from step 220 to step 225.

At step 225 of method 200, the network node determines whether the packet was rejected by the sequence-based anti-replay check due to the sequence number of the packet being outside of the extended anti-replay window. For example, referring to FIG. 1, node 120*b* of system 100 may determine that sequence-based anti-replay checker 182 rejected packet 132 in response to sequence number 134 of packet 132 being less than a lowest sequence number of extended anti-replay window 183. If the network node determines that the packet was not rejected by the sequence-based anti-replay check due to the sequence number of the packet being outside of the extended anti-replay window, method 200 moves from step 225 to step 230, where the network node accepts the packet.

In certain embodiments, once the network node accepts the packet, the network node determines whether the packet's sequence number is greater than the highest sequence number in the extended anti-replay window. For example, referring to FIG. 1, node 120b of system 100 may determine that sequence number 134 of packet 132 is greater than the highest sequence number in extended anti-replay window 183. In some embodiments, once the network node accepts the packet, the network node determines whether the IPSec SA time tick is greater than the highest time tick in the time-based anti-replay window. For example, referring to FIG. 1, node 120b of system 100 may determine that the time tick for IPSec SA session 162 is greater than the highest time tick in time-based anti replay window 183.

In certain embodiments if the network node determines that the packet's sequence number is greater than the highest sequence number in the extended anti-replay window and/or the network node determines that the IPSec SA time tick is greater than the highest time tick in the time-based anti-replay window, the network node updates the extended anti-replay window and/or the time-based anti-replay window accordingly. For example, referring to FIG. 1, if node 120b of system 100 determines that sequence number 134 of packets 132 is greater than the highest sequence number in extended anti-replay window 183 and node 120b also determines that the time tick for IPSec SA session 162 is greater than the highest time tick in time-based anti replay window 183, node 120b may update extended anti-replay window 183 and update time-based anti-replay window 185. Method 200 then advances from step 230 to step 275, where method 200 ends.

If, at step 225, the network node determines that the packet was rejected by the sequence-based anti-replay check due to the sequence number of the packet being outside of the extended anti-replay window, method 200 moves from step 225 to step 235. At step 235 of method 200, the network node performs a time-based anti-replay check. For example, referring to FIG. 1, time-based anti-replay checker 184 of node 120b may perform a time-based anti-replay check to determine whether the time tick is within time-based anti-replay window 185. Method 200 then moves from step 235 to step 240, where the network node performs a selective packet anti-replay check. For example, referring to FIG. 1, selective anti-replay checker 186 may perform a selective anti-replay check to determine whether a range of samples of out-of-window packets 132 received within a predetermined time period include duplicate packets 132. Method 200 then moves from step 240 to step 245.

At step 245 of method 200, the network node determines whether the packet was accepted by both the time-based anti-replay check and by the selective anti-replay check. For example, referring to FIG. 1, node 120b may determine whether packet 132 received from node 120a was accepted by both time-based anti-replay checker 184 and selective anti-replay checker 186. If the network node determines that the packet was accepted by the time-based anti-replay check and by the selective anti-replay check, method 200 moves from step 245 to step 230, where the network node accepts the packet. Method 200 then advances from step 230 to step 275, where method 200 ends. If, at step 245, the network node determines that the packet was not accepted by both the time-based anti-replay check and by the selective anti-replay check, method 200 moves from step 245 to step 250.

At step 250 of method 200, the network node determines whether the packet was rejected by the time-based anti-replay check but accepted by the selective anti-replay check. For example, referring to FIG. 1, node 120b may determine whether packet 132 received from node 120a was rejected by time-based anti-replay checker 184 and accepted by selective anti-replay checker 186. If the network node determines that the packet was rejected by the time-based anti-replay check and accepted by the selective anti-replay check, method 200 advances from step 250 to step 270, where the network node rejects the packet and increases the time-based anti-replay window. For example, referring to FIG. 1, anti-replay engine 180 of node 120b may reject the packet, and window size adjustor 188 may increase time-based anti-replay window 185. Method 200 then moves from step 270 to step 275, where method 200 ends. If, at step 250, the network node determines that the packet was not rejected by the time-based anti-replay check and accepted by the selective anti-replay check, method 200 moves to step 255.

At step 255 of method 200, the network node determines that the packet is rejected by the time-based anti-replay check and accepted by the selective anti-replay check. Method 200 then moves from step 255 to step 265, where the network node rejects the packet and decreases the extended anti-replay window. For example, referring to FIG. 1, anti-replay engine 180 of node 120b may reject packet 132 received from node 120a, and window size adjustor 188 may decrease time-based anti-replay window 185. Method 200 moves from step 265 to step 275, where method 200 ends.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example flow diagram for automatically adjusting a time-based anti-replay window size including the particular steps of the method of FIG. 2, this disclosure contemplates any suitable flow diagram for adjusting an anti-replay window size including any suitable steps, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
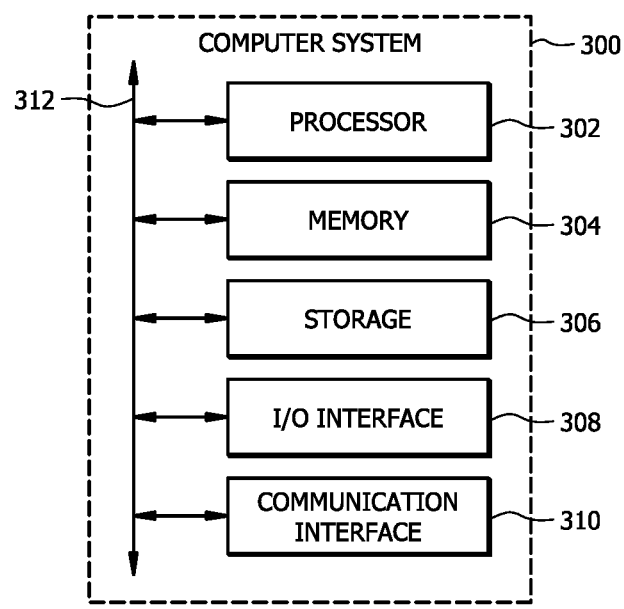
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or USB drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A network node comprising one or more processors and one or more computer-readable non-transitory storage media coupled to the one or more processors and including instructions that, when executed by the one or more processors, cause the network node to perform operations comprising:
   receiving a packet associated with a session;
   performing a sequence-based anti-replay check;
   determining that the sequence-based anti-replay check rejected the packet;
   performing a time-based anti-replay check;
   performing a selective anti-replay check; and
   determining whether to dynamically adjust a time-based anti-replay window size based on performing at least one of the following checks:
   the sequence-based anti-replay check,
   the time-based anti-replay check, and
   the selective anti-replay check.

2. The network node of claim 1, the operations further comprising:
   determining that the packet was rejected by the time-based anti-replay check;
   determining that the packet was accepted by the selective anti-replay check;
   rejecting the packet; and
   increasing the time-based anti-replay window size.

3. The network node of claim 1, the operations further comprising:

determining that the packet was rejected by the selective anti-replay check;
rejecting the packet; and
decreasing the time-based anti-replay window size.

4. The network node of claim 1, wherein performing the sequence-based anti-replay check comprises:
determining a sequence number associated with the packet;
rejecting the packet in the event the sequence number is less than a lowest sequence number in an anti-replay window; and
accepting the packet in the event the sequence number is greater than the lowest sequence number in the anti-replay window.

5. The network node of claim 1, wherein performing the time-based anti-replay check comprises determining whether a time tick delay associated with the session is within a time-based anti-replay window.

6. The network node of claim 1, wherein performing the selective anti-replay check comprises determining whether a quantity of duplicate packets received outside of an anti-replay window and within a predetermined amount of time exceeds a predetermined threshold.

7. The network node of claim 1, wherein:
the network node is a software-defined wide area network (SD-WAN) edge router; and
the session is an Internet Protocol Security (IPSec) Security Associations (SA) session.

8. A method, comprising:
receiving, by a network node, a packet associated with a session;
performing, by the network node, a sequence-based anti-replay check;
determining, by the network node, that the sequence-based anti-replay check rejected the packet;
performing, by the network node, a time-based anti-replay check;
performing, by the network node, a selective anti-replay check; and
determining, by the network node, whether to dynamically adjust a time-based anti-replay window size based on performing at least one of the following checks:
the sequence-based anti-replay check,
the time-based anti-replay check, and
the selective anti-replay check.

9. The method of claim 8, further comprising:
determining, by the network node, that the packet was rejected by the time-based anti-replay check;
determining, by the network node, that the packet was accepted by the selective anti-replay check;
rejecting, by the network node, the packet; and
increasing, by the network node, the time-based anti-replay window size.

10. The method of claim 8, further comprising:
determining, by the network node, that the packet was rejected by the selective anti-replay check;
rejecting, by the network node, the packet; and
decreasing, by the network node, the time-based anti-replay window size.

11. The method of claim 8, wherein performing the sequence-based anti-replay check comprises:
determining a sequence number associated with the packet;
rejecting the packet in the event the sequence number is less than a lowest sequence number in an anti-replay window; and
accepting the packet in the event the sequence number is greater than the lowest sequence number in the anti-replay window.

12. The method of claim 8, wherein performing the time-based anti-replay check comprises determining whether a time tick delay associated with the session is within a time-based anti-replay window.

13. The method of claim 8, wherein performing the selective anti-replay check comprises determining whether a quantity of duplicate packets received outside of an anti-replay window and within a predetermined amount of time exceeds a predetermined threshold.

14. The method of claim 8, wherein:
the network node is a software-defined wide area network (SD-WAN) edge router; and
the session is an Internet Protocol Security (IPSec) Security Associations (SA) session.

15. One or more computer-readable non-transitory storage media embodying instructions that, when executed by a processor, cause the processor to perform operations comprising:
receiving a packet associated with a session;
performing a sequence-based anti-replay check;
determining that the sequence-based anti-replay check rejected the packet;
performing a time-based anti-replay check;
performing a selective anti-replay check; and
determining whether to dynamically adjust a time-based anti-replay window size based on performing at least one of the following checks:
the sequence-based anti-replay check,
the time-based anti-replay check, and
the selective anti-replay check.

16. The one or more computer-readable non-transitory storage media of claim 15, the operations further comprising:
determining that the packet was rejected by the time-based anti-replay check;
determining that the packet was accepted by the selective anti-replay check;
rejecting the packet; and
increasing the time-based anti-replay window size.

17. The one or more computer-readable non-transitory storage media of claim 15, the operations further comprising:
determining that the packet was rejected by the selective anti-replay check;
rejecting the packet; and
decreasing the time-based anti-replay window size.

18. The one or more computer-readable non-transitory storage media of claim 15, wherein performing the sequence-based anti-replay check comprises:
determining a sequence number associated with the packet;
rejecting the packet in the event the sequence number is less than a lowest sequence number in an anti-replay window; and
accepting the packet in the event the sequence number is greater than the lowest sequence number in the anti-replay window.

19. The one or more computer-readable non-transitory storage media of claim 15, wherein performing the time-based anti-replay check comprises determining whether a time tick delay associated with the session is within a time-based anti-replay window.

20. The one or more computer-readable non-transitory storage media of claim 15, wherein performing the selective anti-replay check comprises determining whether a quantity of duplicate packets received outside of an anti-replay window and within a predetermined amount of time exceeds a predetermined threshold.

\* \* \* \* \*